United States Patent [19]
Park

[11] Patent Number: 5,862,472
[45] Date of Patent: Jan. 19, 1999

[54] CIRCUIT FOR INDICATING LOSS OF PORTABLE TELEPHONE AND CONTROL METHOD THEREOF

[75] Inventor: Tae-Guen Park, Gumi, Rep. of Korea

[73] Assignee: SamSung Electronics Co., Ltd., Suwon, Rep. of Korea

[21] Appl. No.: 681,446

[22] Filed: Jul. 23, 1996

[30] Foreign Application Priority Data

Jul. 29, 1995 [KR] Rep. of Korea ................. 1995 23091

[51] Int. Cl.[6] ........................................ G06F 7/04
[52] U.S. Cl. .................... 455/411; 458/410; 458/38.2
[58] Field of Search ............................. 455/410, 411, 455/550, 461, 462, 38.2

[56] References Cited

U.S. PATENT DOCUMENTS

| | | | |
|---|---|---|---|
| 3,694,579 | 9/1972 | McMurray | 455/410 |
| 4,843,385 | 6/1989 | Borras | 340/825 |
| 5,134,708 | 7/1992 | Marui et al. | 455/33.2 |
| 5,274,695 | 12/1993 | Greem | 455/410 |
| 5,299,132 | 3/1994 | Wortham | 455/410 |
| 5,351,290 | 9/1994 | Naeini et al. | 455/410 |
| 5,515,419 | 5/1996 | Sheffer | 455/410 |
| 5,646,604 | 7/1997 | Maruyama et al. | 455/411 |
| 5,646,977 | 7/1997 | Koizumi | 455/411 |

*Primary Examiner*—Richemond Dorvil
*Assistant Examiner*—Daniel Abebe
*Attorney, Agent, or Firm*—Robert E. Bushnell, Esq.

[57] ABSTRACT

A circuit and method for a portable telephone prevents a finder from exploiting the interests of the owner if the telephone becomes lost. The method contemplates the steps of: generating an audible alarm and a first message requesting input of a predetermined password when one of a predetermined time period elapses and a number of outgoing calls exceeds a predetermined number after an alarm function is enabled; detecting whether the predetermined password is input, and stopping generation of the alarm and the first message when the predetermined password is input; generating a second message indicating how an owner of the portable telephone can be contacted and activating a loss mode of the portable telephone when the predetermined password is not input; and automatically dialing a telephone number corresponding to the owner when a predetermined key on the portable telephone is input after the loss mode is activated.

16 Claims, 3 Drawing Sheets

```
            ⋮
ADD1  |  AAH   |
            ⋮
ADD2  |  12H   |
      |  34H   |
      |  5FH   |
            ⋮
ADD3  |  24    |
      |  57    |
            ⋮
ADD4  |  O     |
      |  W     |
      |  N     |
      |  E     |
      |  R     |
      |        |
      |  T     |
      |  E     |
      |  L     |
      |  E     |
      |  P     |
      |  H     |
      |  O     |
      |  N     |
      |  E     |
      |        |
      |  N     |
      |  U     |
      |  M     |
      |  B     |
      |  E     |
      |  R     |
            ⋮
```

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

CIRCUIT FOR INDICATING LOSS OF PORTABLE TELEPHONE AND CONTROL METHOD THEREOF

CROSS-REFERENCE TO RELATED APPLICATIONS

This application makes reference to, incorporates the same herein, and claims all benefits accruing under 35 U.S.C. §119 arising from an application for Circuit For Indicating Loss Of Portable Telephone And Control Method Thereof earlier filed in the Korean Industrial Property Office on 29 Jul. 1995 and there duly assigned Ser. No. 23091/1995.

BACKGROUND OF THE INVENTION

The present invention relates generally to a portable telephone, and more particularly, to a circuit and method for indicating that a portable telephone has been lost by its owner.

Since a portable telephone is typically moved from place to place with its owner, it can easily become lost or misplaced. If the lost telephone winds up in the hands of an unscrupulous finder, unauthorized long distance fees can be charged to the owner. Therefore, the economic loss involved when a portable telephone is lost may be substantially greater than the cost of the telephone itself Moreover, if a person calls the lost telephone in an effort to contact the owner, the finder may obtain information that is private to the owner, and can possibly make statements that are harmful to the owner's interests. The main reason why this problem exists is because, conventionally, there has been no way for the finder to easily contact the owner, even if the finder is gracious enough to want to return the telephone to its rightful owner.

One notable effort directed towards the general concept of locating a particular portable telephone is the Vehicle Locating And Communicating Method And Apparatus Using Cellular Telephone Network, U.S. Pat. No. 5,299,132 issued to Wortham. In Wortham '132, a method is provided by which one can locate and communicate with a vehicle having a mobile cellular unit installed therein. A microprocessor periodically instructs the mobile cellular unit to initiate a call to a host controller, and upon receipt of transmitting instructions from the host controller, the mobile cellular unit transmits information regarding its location to the host controller. While this type of effort is useful as an attempt to provide some type of scheme for determining where a particular mobile cellular unit and the corresponding vehicle are located, I have noticed that this scheme prevents individuals from effectively using the mobile cellular unit if the unit should become lost. Accordingly, I have found there exists a strong need for a portable telephone having features that enhance the ability of the telephone owner to recover the telephone when lost, and also to prevent a vicious finder from exploiting the interests of the owner.

SUMMARY OF THE INVENTION

Therefore, it is an object of the present invention to provide an improved portable telecommunications process and device.

It is another object to provide a circuit and method for a portable telephone capable of indicating that the portable telephone has been lost by its owner.

It is yet another object to provide a circuit and method for a portable telephone that prevents a finder from exploiting the interests of the telephone's owner if the telephone becomes lost.

It is still yet another object to provide a circuit and method for a portable telephone that instructs a finder as to how to contact the telephone's owner in the event that the telephone becomes lost.

It is yet another object to provide a circuit and method for a portable telephone that automatically dials the owner's telephone number upon depression of a predetermined key when a loss mode of the telephone is activated.

To achieve these and other objects, the present invention provides a portable telephone contemplating a key input unit having a plurality of keys for providing inputs that enable performance of an alarm function. A first memory includes a first area for storing data indicating whether the alarm function is turned on, a second area for storing information identifying an owner of the portable telephone, a third area for storing a predetermined password, and a fourth area for storing a telephone number corresponding to the owner of the portable telephone. A second memory stores a program that enables performance of the alarm function. A third memory temporarily stores data generated during performance of the alarm function. A tone generator generates an audible tone during the performance of the alarm function. A display unit displays a first message requesting input of the predetermined password via the key input unit and a second message identifying the owner of the portable telephone during the performance of the alarm function. A controller enables the tone generator to generate the audible tone and enables the display unit to display the first message when either a predetermined time period elapses or a number of outgoing calls equals a predetermined number after the alarm function is turned on. The controller detects whether the predetermined password is input, controls the tone generator to stop generation of the audible tone and controls the display unit to stop display of the first message when the predetermined password is input. The controller further enables the display unit to display the second message and activates a loss mode of the portable telephone when the predetermined password is not input. When a predetermined key on the key input unit is depressed after the loss mode is activated, the controller automatically dials the telephone number corresponding to the owner of the portable telephone.

These and other objects can also be achieved with a method for a portable telephone contemplating the steps of: generating an audible alarm and a first message requesting input of a predetermined password when one of a predetermined time period elapses and a number of outgoing calls exceeds a predetermined number after an alarm function is enabled; detecting whether the predetermined password is input, and stopping generation of the alarm and the first message when the predetermined password is input; generating a second message indicating how an owner of the portable telephone can be contacted and activating a loss mode of the portable telephone when the predetermined password is not input; and automatically dialing a telephone number corresponding to the owner when a predetermined key on the portable telephone is input after the loss mode is activated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a diagram illustrating the configuration of an electrically erasable programmable read only memory (EEPROM) constructed according to the principles of the present invention.

DETAILED DESCRIPTION OF THE INVENTION

In the following description, several specific details, such as the configuration of memory cells, are set forth in order to provide a thorough understanding of the present invention. It will be understood by those skilled in the art, however, that other embodiments of the present invention may be practiced without these specific details, or with alternative specific details.

Figure 1:
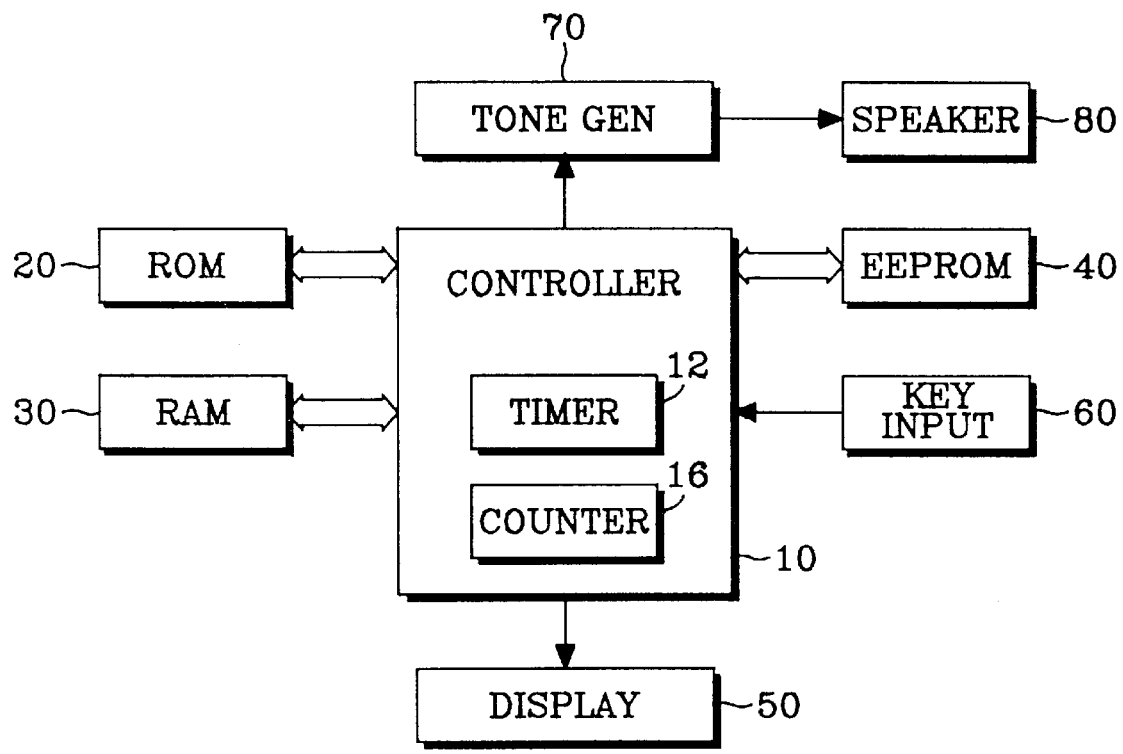
FIG. 1 is a block diagram illustrating a circuit for indicating the loss of a portable telephone constructed according to the principles of the present invention.

Turning now to the drawings and referring to FIG. 1, a block diagram of a circuit for indicating the loss of a portable telephone constructed according to the principles of the present invention is shown. In FIG. 1, a controller 10 including a timer 12 and a counter 16 controls the overall circuit operation. A read only memory (ROM) 20 stores a program that enables controller 10 to execute the method of the present invention. A random access memory (RAM) 30 temporarily stores data generated during execution of the present invention. An electrically erasable programmable read only memory (EEPROM) 40 stores data used to execute the present invention. A display unit 50, such as a liquid crystal display (LCD), provides variable visual displays during execution of the present invention. A key input unit 60 has a plurality of alphanumeric and function keys to enable user inputs. A tone generator 70 generates various tones that are output to a speaker 80.

The operation of the present invention is roughly divided into two parts. The first part involves turning on, or enabling, an alarm function that indicates when the portable telephone may be lost, and the second part involves the operations that occur after the alarm function is enabled.

First, the operation of turning on the alarm function of the portable telephone will be described with reference to FIGS. 1 and 3 collectively.

The portable telephone user, who is presumably the owner, turns on the alarm function of the portable telephone by depressing predetermined keys on key input unit 60. More particularly, when the user depresses the predetermined keys on key input unit 60, controller 10 detects these inputs, and writes the corresponding data in electrically erasable programmable read only memory (EEPROM) 40. The configuration of electrically erasable programmable read only memory (EEPROM) 40 is shown in FIG. 3. In FIG. 3, reference numerals ADD1, ADD2, ADD3 and ADD4 represent address regions where various kinds of data are written. For example, ADD1 can be used to store data that informs controller 10 whether the alarm function is enabled, ADD2 can be used to store character data that identifies the telephone's owner, ADD3 can be used to store a predetermined password, and ADD4 can be used to store data representative of the owner's telephone number.

Next, the operations that occur after the alarm function is turned on will be described with reference to FIGS. 1 through 3 collectively.

Figure 2:
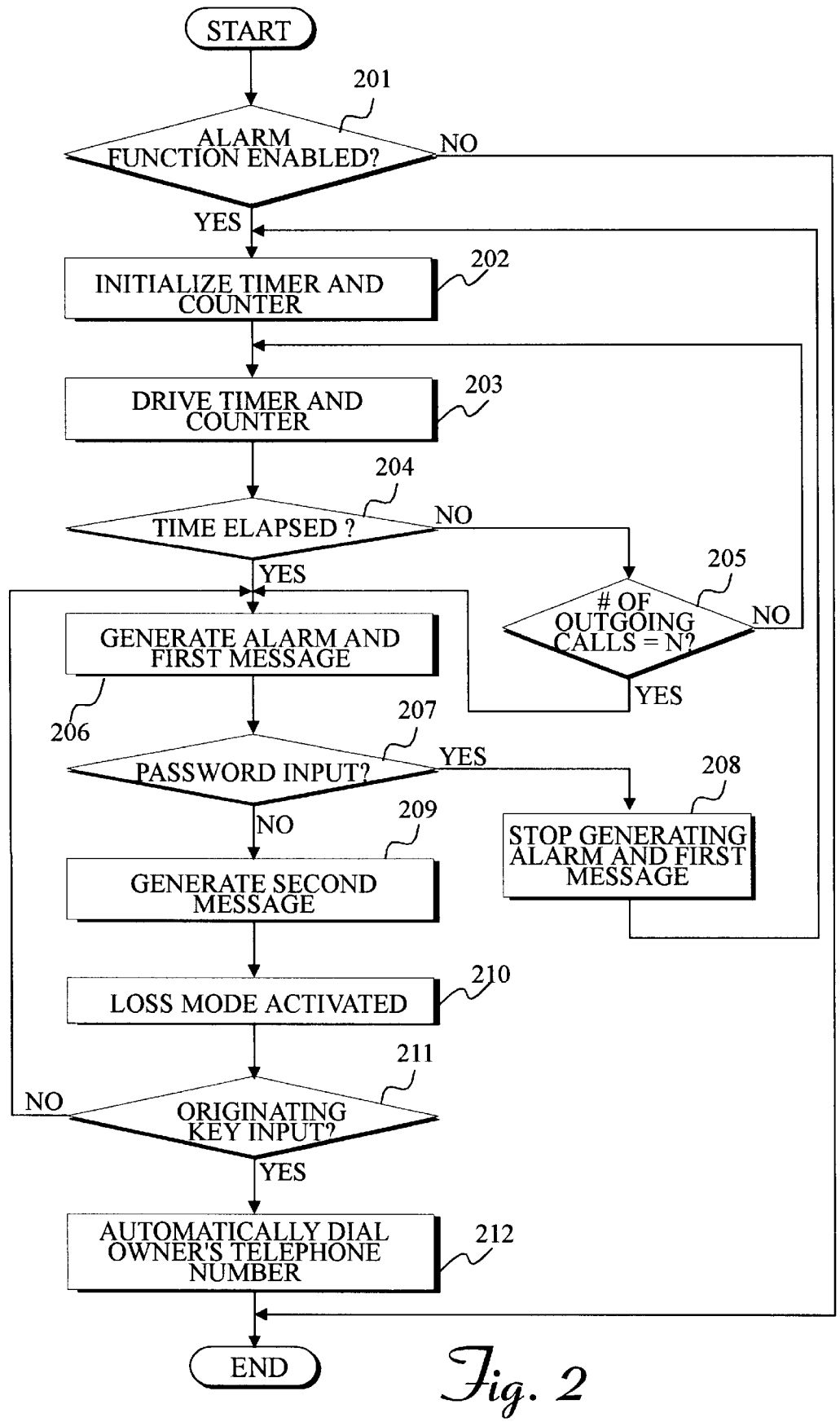
FIG. 2 is a flow chart illustrating a method of indicating the loss of a portable telephone according to the principles of the present invention.

In step 201 of FIG. 2, controller 10 determines whether the alarm function is enabled by checking a specific address of electrically erasable programmable read only memory (EEPROM) 40. When the alarm function is enabled, controller 10 initializes timer 12 and counter 16 in step 202. In step 203, controller 10 drives the timer 12 and counter 16 to perform a timing operation and a counting operation, respectively. In particular, timer 12 performs a timing operation to detect when a predetermined time period has elapsed, while counter 16 performs a counting operation to count the number of outgoing calls that are placed from the portable telephone. In step 204, controller 10 checks timer 12 to determine whether the predetermined time period has elapsed. If the predetermined time period has not elapsed in step 204, controller 10 checks counter 16 to determine whether the number of outgoing calls that have been initiated from the portable telephone equals N, in step 205. According to an exemplary embodiment, the predetermined time period can be set to 10 hours, and N can be set to 5.

When the predetermined time period has elapsed in step 204, or the number of outgoing calls that have been initiated from the portable telephone equals N in step 205, step 206 is performed. In step 206, a specific audible alarm is generated in tone generator 70 and aurally provided through speaker 80, and a first message is generated for display on display unit 50. The first message provides an instruction to input a predetermined password that has been previously registered into one of the address regions of electrically erasable programmable read only memory (EEPROM) 40 of the portable telephone. If the portable telephone is not actually lost, the owner will know this password and can provide its input through key input unit 60. Controller 10 determines whether the predetermined password is input in step 207. If the password is input, generation of the audible alarm and the first message is stopped in step 208, and the method proceeds back to step 202.

When the portable telephone is not possessed by its rightful owner and is lost, other individuals will not know the predetermined password and its input is therefore not provided. In these situations, after the audible alarm and first message have been generated for a given amount of time (e.g., 10 minutes) without the predetermined password being input, a second message providing an instruction to locate or contact the owner of the portable telephone is generated for display on display unit 50 in step 209. This second message may, for example, include a listing of the owner's telephone number, information regarding the owner's identity, and other information regarding how the owner can be contacted. The contents of the second message are stored within electrically erasable programmable read only memory (EEPROM) 40, as pre previously indicated. After the second message is generated and displayed, a loss mode indicating that the portable telephone is lost is activated in step 210. Once the loss mode is activated, the portable telephone is unable to transmit or receive calls. This call prevention feature is enabled since the portable telephone can initiate a call only after inputting an originating (i.e., send) key on key input unit 60 after dialing. Accordingly, controller 10 determines whether the originating key is input during the loss mode, in step 211. When the originating key is input during the loss mode, the portable telephone automatically dials the owner's telephone number stored in electrically erasable programmable read only memory (EEPROM) 40, in step 212. Therefore, controller 10 prohibits a finder from making telephone calls to arbitrary numbers, and instead calls the owner of the portable telephone. In these instances, the owner is notified, at least indirectly, that the portable telephone has been found. When the originating key is not input during the loss mode, the method proceeds back to step 206 to provide another opportunity to input the password.

As described above, when a portable telephone constructed according to the principles of the present invention becomes lost, a finder is substantially prohibited from using the lost telephone, and is provided with a message regarding how the rightful owner can be contacted. Further, if the finder depresses the originating key during the loss mode, the present invention enables the portable telephone to automatically dial the owner's telephone number, thereby informing the owner that the telephone has been found.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A portable telephone, comprising:

a key input unit having a plurality of keys, for providing inputs that enable performance of an alarm function;

a first memory having a first area for storing data indicating whether said alarm function is turned on, a second area for storing information identifying an owner of said portable telephone, a third area for storing a predetermined password, and a fourth area for storing a telephone number corresponding to the owner of said portable telephone;

a second memory for storing a program that enables performance of said alarm function;

a third memory for temporarily storing data generated during performance of said alarm function;

a tone generator for generating an audible tone during the performance of said alarm function;

a display unit for displaying a first message requesting input of said predetermined password via said key input unit and a second message identifying the owner of said portable telephone during the performance of said alarm function; and a controller for enabling said tone generator to generate said audible tone and enabling said display unit to display said first message when one of a predetermined time period elapses and a number of outgoing calls equals a predetermined number after said alarm function is turned on, detecting whether said predetermined password is input, controlling said tone generator to stop generation of said audible tone and controlling said display unit to stop display of said first message when said predetermined password is input, enabling said display unit to display said second message and activating a loss mode of said portable telephone when said predetermined password is not input, and automatically dialing said telephone number corresponding to the owner of said portable telephone when a predetermined key on said key input unit is depressed after said loss mode is activated.

2. The portable telephone as claimed in claim 1, wherein said first memory comprises an electrically erasable programmable read only memory.

3. The portable telephone as claimed in claim 2, wherein said controller comprises:

a timer for performing a timing operation to determine whether said predetermined time period elapses after said alarm function is turned on; and a counter for performing a counting operation to determine whether said number of outgoing calls equals said predetermined number after said alarm function is turned on.

4. The portable telephone as claimed in claim 3, wherein said controller prevents outgoing calls to telephone numbers other than said telephone number corresponding to the owner of said portable telephone after said loss mode is activated.

5. The portable telephone as claimed in claim 2, wherein said controller prevents outgoing calls to telephone numbers other than said telephone number corresponding to the owner of said portable telephone after said loss mode is activated.

6. The portable telephone as claimed in claim 1, wherein said controller comprises:

a timer for performing a timing operation to determine whether said predetermined time period elapses after said alarm function is turned on; and a counter for performing a counting operation to determine whether said number of outgoing calls equals said predetermined number after said alarm function is turned on.

7. The portable telephone as claimed in claim 6, wherein said controller prevents outgoing calls to telephone numbers other than said telephone number corresponding to the owner of said portable telephone after said loss mode is activated.

8. The portable telephone as claimed in claim 1, wherein said controller prevents outgoing calls to telephone numbers other than said telephone number corresponding to the owner of said portable telephone after said loss mode is activated.

9. A method for controlling operation of a portable telephone, comprising the steps of:

generating an audible tone and a first message requesting input of a predetermined password when one of a predetermined time period elapses and a number of outgoing calls equals a predetermined number after an alarm function is enabled;

detecting whether said predetermined password is input, and stopping generation of said audible tone and said first message when said predetermined password is input;

generating a second message indicating how an owner of said portable telephone can be contacted and activating a loss mode of said portable telephone when said predetermined password is not input; and automatically dialing a telephone number corresponding to the owner of said portable telephone when a predetermined key on said portable telephone is input after said loss mode is activated.

10. The method as claimed in claim 9, further comprising the step of preventing outgoing calls to telephone numbers other than said telephone number corresponding to the owner of said portable telephone after said loss mode is activated.

11. A method for controlling operation of a portable telephone, comprising the steps of:

enabling an alarm function of said portable telephone in response to an input from a user;

performing a timing operation and a counting operation in response to enabling said alarm function;

monitoring said timing operation to determine whether a predetermined time period has elapsed since said alarm function has been enabled;

monitoring said counting operation to determine whether a number of outgoing calls placed from said portable telephone equals a predetermined number since said alarm function has been enabled;

generating an audible tone and a first message requesting input of a predetermined password when one of said predetermined time period has elapsed and said number of outgoing calls placed from said portable telephone equals said predetermined number since said alarm function has been enabled;

detecting whether said predetermined password is input, and stopping generation of said audible tone and said first message when said predetermined password is input;

generating a second message indicating how the user of said portable telephone can be contacted and activating a loss mode of said portable telephone when said predetermined password is not input; and automatically dialing a telephone number corresponding to the user when a predetermined key on said portable telephone is input after said loss mode is activated.

12. The method as claimed in claim 11, further comprising the step of preventing outgoing calls to telephone numbers other than said telephone number corresponding to the user of said portable telephone after said loss mode is activated.

13. The method as claimed in claim 11, further comprising the step of the user storing said telephone number corresponding to the user within a memory of said portable telephone before enabling said alarm function.

14. The method as claimed in claim 13, further comprising the step of preventing outgoing calls to telephone numbers other than said telephone number corresponding to the user of said portable telephone after said loss mode is activated.

15. The method as claimed in claim 11, wherein said predetermined key comprises a key that is depressed after dialing a given telephone number in order to initiate a call to said given telephone number.

16. The method as claimed in claim 14, further comprising the step of preventing outgoing calls to telephone numbers other than said telephone number corresponding to the user of said portable telephone after said loss mode is activated.

\* \* \* \* \*